(12) United States Patent
Niewiadomski et al.

(10) Patent No.: US 10,962,980 B2
(45) Date of Patent: Mar. 30, 2021

(54) SYSTEM AND METHODS FOR REVERSE BRAKING DURING AUTOMATED HITCH ALIGNMENT

(71) Applicant: Ford Global Technologies, LLC, Dearborn, MI (US)

(72) Inventors: Luke Niewiadomski, Dearborn, MI (US); Erick Michael Lavoie, Dearborn, MI (US); Eric L. Reed, Livonia, MI (US); Chen Zhang, San Jose, CA (US); Roger Arnold Trombley, Ann Arbor, MI (US); Douglas J. Rogan, Ferndale, MI (US); Bruno Sielly Jales Costa, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/117,076

(22) Filed: Aug. 30, 2018

(65) Prior Publication Data
US 2020/0073398 A1 Mar. 5, 2020

(51) Int. Cl.
*G05D 1/02* (2020.01)
*B60D 1/36* (2006.01)

(52) U.S. Cl.
CPC ............ *G05D 1/0246* (2013.01); *B60D 1/36* (2013.01); *G05D 1/0255* (2013.01); *G05D 1/0278* (2013.01); *G05D 2201/0213* (2013.01)

(58) Field of Classification Search
CPC .. G05D 1/0246; G05D 1/0255; G05D 1/0278; G05D 2201/0213; B60D 1/36
See application file for complete search history.

(56) References Cited

U.S. PATENT DOCUMENTS

| | | | |
|---|---|---|---|
| 6,480,104 B1 | 11/2002 | Wall et al. | |
| 9,102,271 B2 | 8/2015 | Trombley et al. | |
| 9,434,381 B2 | 9/2016 | Windeler | |
| 9,457,632 B1 | 10/2016 | Windeler et al. | |
| 9,499,018 B2 | 11/2016 | Gehrke et al. | |
| 9,550,399 B2 | 1/2017 | Jones et al. | |
| 10,471,591 B1 * | 11/2019 | Hinkle | ...................... B25J 9/161 |
| 2004/0226768 A1 | 11/2004 | DeLuca et al. | |
| 2005/0246081 A1 | 11/2005 | Bonnet et al. | |
| 2006/0293800 A1 | 11/2006 | Bauer et al. | |
| 2007/0058838 A1 * | 3/2007 | Taniguchi | .......... G06K 9/00664 |
| | | | 382/103 |
| 2010/0126985 A1 | 5/2010 | Feng et al. | |
| 2012/0283909 A1 | 11/2012 | Dix | |

(Continued)

FOREIGN PATENT DOCUMENTS

| | | |
|---|---|---|
| EP | 2682329 A1 | 1/2014 |
| JP | 2009051725 A | 3/2009 |

*Primary Examiner* — Navid Ziaeianmehdizadeh
(74) *Attorney, Agent, or Firm* — Raymond Coppiellie; Price Heneveld LLP

(57) ABSTRACT

A vehicle system comprises a hitch ball mounted on a vehicle. The system further comprises a plurality of sensor devices comprising an ultrasonic sensor and an image sensor. A controller is configured to process image data from the image sensor identifying a coupler position of a trailer. The controller is further configured to process ultrasonic data from the ultrasonic sensor identifying a proximity of the trailer. Based on the proximity of the trailer, the system is configured to identify the trailer in a detection range of the image sensor.

17 Claims, 9 Drawing Sheets

(56) References Cited

U.S. PATENT DOCUMENTS

| | | | |
|---|---|---|---|
| 2014/0183841 A1 | 7/2014 | Jones | |
| 2015/0234045 A1* | 8/2015 | Rosenblum | G06T 7/215 342/71 |
| 2016/0001632 A1 | 1/2016 | Song et al. | |
| 2016/0167482 A1 | 6/2016 | Oh et al. | |
| 2016/0185169 A1 | 6/2016 | Strand | |
| 2016/0272024 A1 | 9/2016 | Bochenek et al. | |
| 2016/0288601 A1* | 10/2016 | Gehrke | G06T 7/215 342/71 |
| 2016/0320477 A1* | 11/2016 | Heimberger | G01S 13/867 |
| 2016/0347263 A1 | 12/2016 | Kwon et al. | |
| 2016/0374147 A1 | 12/2016 | Song et al. | |
| 2017/0139419 A1* | 5/2017 | Jagenstedt | G01S 13/867 |
| 2017/0158007 A1* | 6/2017 | Lavoie | B60T 7/20 |
| 2017/0274827 A1* | 9/2017 | Lewis | G08G 1/167 |
| 2018/0157920 A1* | 6/2018 | Hu | G01S 13/86 |
| 2018/0312022 A1 | 11/2018 | Mattern et al. | |
| 2018/0361929 A1* | 12/2018 | Zhang | G06K 9/00664 382/103 |
| 2019/0228239 A1* | 7/2019 | Wang | G06K 9/00805 |
| 2019/0346557 A1* | 11/2019 | Baba | G01S 13/86 |
| 2019/0366929 A1* | 12/2019 | Maruoka | B25J 9/161 |
| 2020/0001919 A1* | 1/2020 | Niewiadomski | G01J 5/0025 340/584 |

* cited by examiner

SYSTEM AND METHODS FOR REVERSE BRAKING DURING AUTOMATED HITCH ALIGNMENT

FIELD OF THE DISCLOSURE

The present disclosure generally relates to a system for assisting in a vehicle-trailer hitching operation. In particular, the present disclosure relates to a system for detecting a force applied to a hitch assembly and related applications.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system comprising a hitch ball mounted on a vehicle is disclosed. The system comprises a plurality of sensor devices comprising an ultrasonic sensor and an image sensor. A controller is configured to process image data from the image sensor identifying a coupler position of a trailer. The controller is further configured to process ultrasonic data from the ultrasonic sensor identifying a proximity of the trailer. Based on the proximity of the trailer, the system is configured to identify the trailer in a detection range of the image sensor.

Embodiments of the first aspect of the invention can include any one or a combination of the following features:
- the controller is configured to control a motion of the vehicle aligning the hitch ball with the coupler position;
- the controller is further configured to correct for a misidentification of the coupler position identified in the image data based on the proximity of the trailer identified from the ultrasonic data;
- the controller is further configured to: monitor the proximity of the trailer based on the ultrasonic data; monitor the location of the coupler based on the image data; and suppress a motion instruction of the location based on the proximity of the trailer;
- the suppression of the motion instruction comprises stopping the motion of the vehicle;
- the suppression of the motion instruction is in response to the proximity of the trailer being less than a change in the proximity detected via the ultrasonic data in addition to a predetermined distance constant;
- the controller is further configured to: control a notification indicating that the trailer is outside the detection range; and
- the detection range of the notification provides for the vehicle to be repositioned at a greater distance within the detection range.

According to another aspect of the present disclosure, a method for controlling a vehicle is disclosed. The method comprises processing image data identifying a coupler position of a trailer and processing ultrasonic data identifying a proximity of the trailer. The method further comprises controlling a motion of the vehicle aligning the hitch ball with the coupler position and monitoring proximity of the trailer relative to the coupler position. In response to a comparison of the coupler position with the proximity, the method comprises halting the motion of the vehicle.

According to yet another aspect of the present disclosure, a vehicle system is disclosed. The system comprises a hitch ball mounted on a vehicle and an ultrasonic sensor configured to capture ultrasonic data rearward of the vehicle. An image sensor is configured to capture image data rearward of the vehicle. A controller is configured to process image data from the image sensor identifying a coupler position of a trailer and control a motion of the vehicle aligning the hitch ball with the coupler position. The controller is further configured to process ultrasonic data from the ultrasonic sensor identifying a proximity of the trailer and monitor the proximity of the trailer relative to the coupler position. The controller corrects for a misidentification of the coupler position identified in the image data based on the proximity of the trailer identified from the ultrasonic data.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
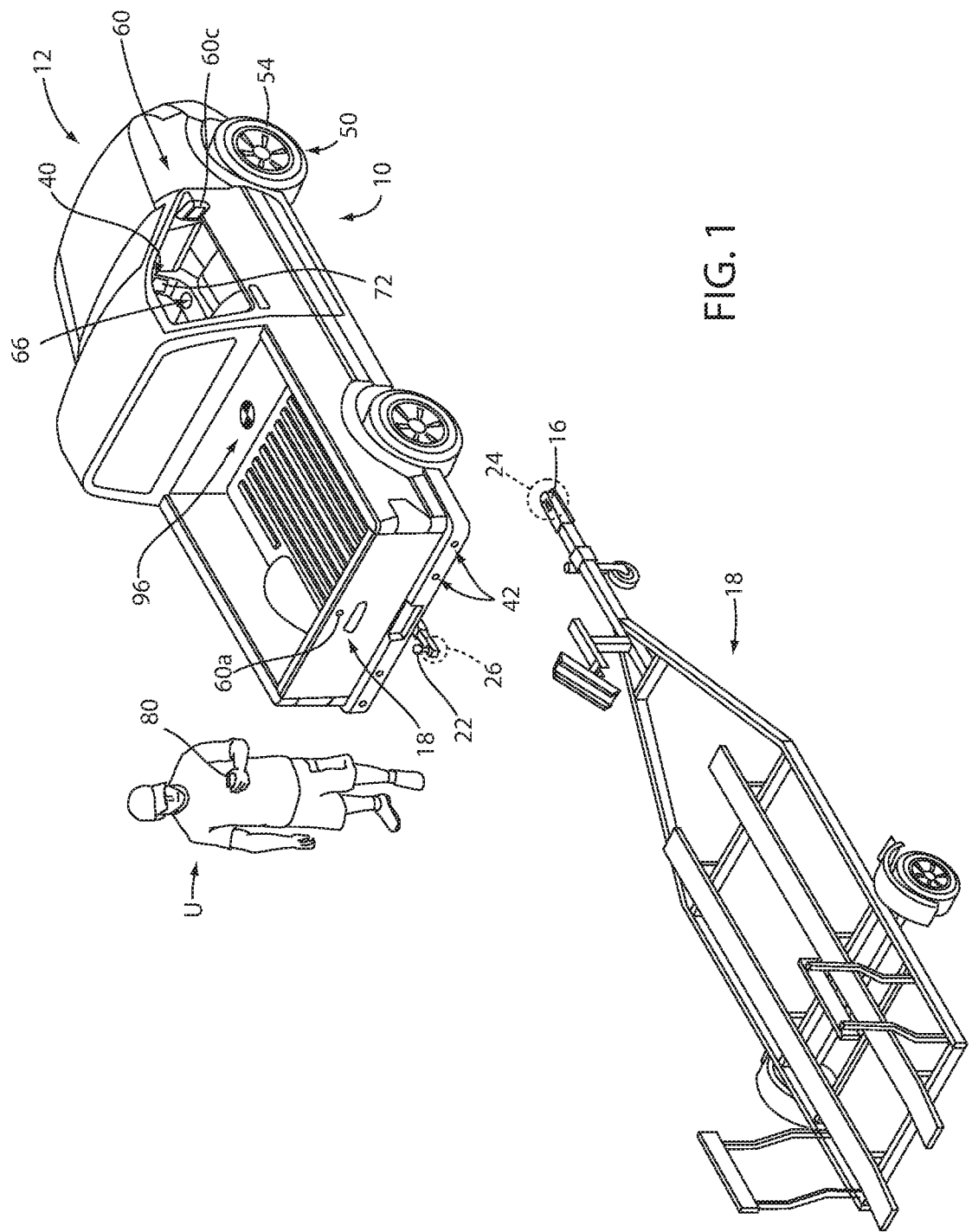
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to detect a proximity of the coupler 16 in connection with the trailer 18. The proximity of the trailer 18 may be detected in response to a signal received by the controller 14 from one or more proximity sensors 30. The proximity sensors 30 may correspond to various sensors, including, but not limited to, ultrasonic sensors, electromagnetic sensors, radar sensors, laser sensors, and/or various types of sensors that may be configured to detect a distance of an object along the vehicle path 20. As further discussed in reference to FIGS. 5-9, the system 10 may utilize proximity information from the one or more proximity sensor 30 in combination with additional sensors, which may be utilized to detect and track the coupler position 24. Accordingly, the system 10 may provide for improved operational accuracy and error reduction by utilizing the proximity sensor 30 in combination with at least one addition sensor (e.g., a camera or image system). In this way, the system accurately identify the coupler position 24 and control the vehicle 12 to align the hitch position 26 with the coupler position 24.

Figure 2:
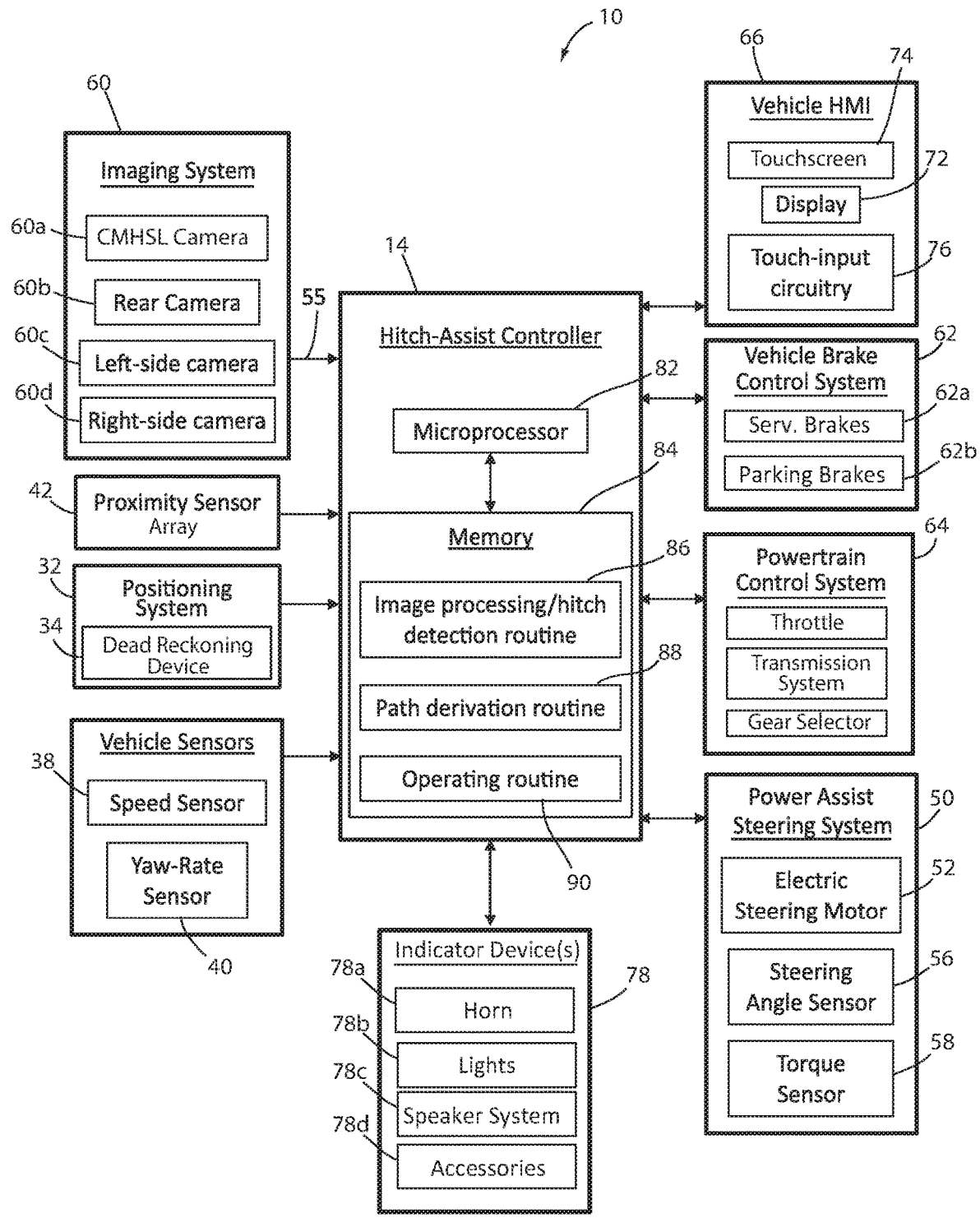
FIG. 2 is a diagram of a system according to an aspect of the disclosure for assisting in aligning the vehicle with a trailer in a position for hitching the trailer to the vehicle.
Figure 3:
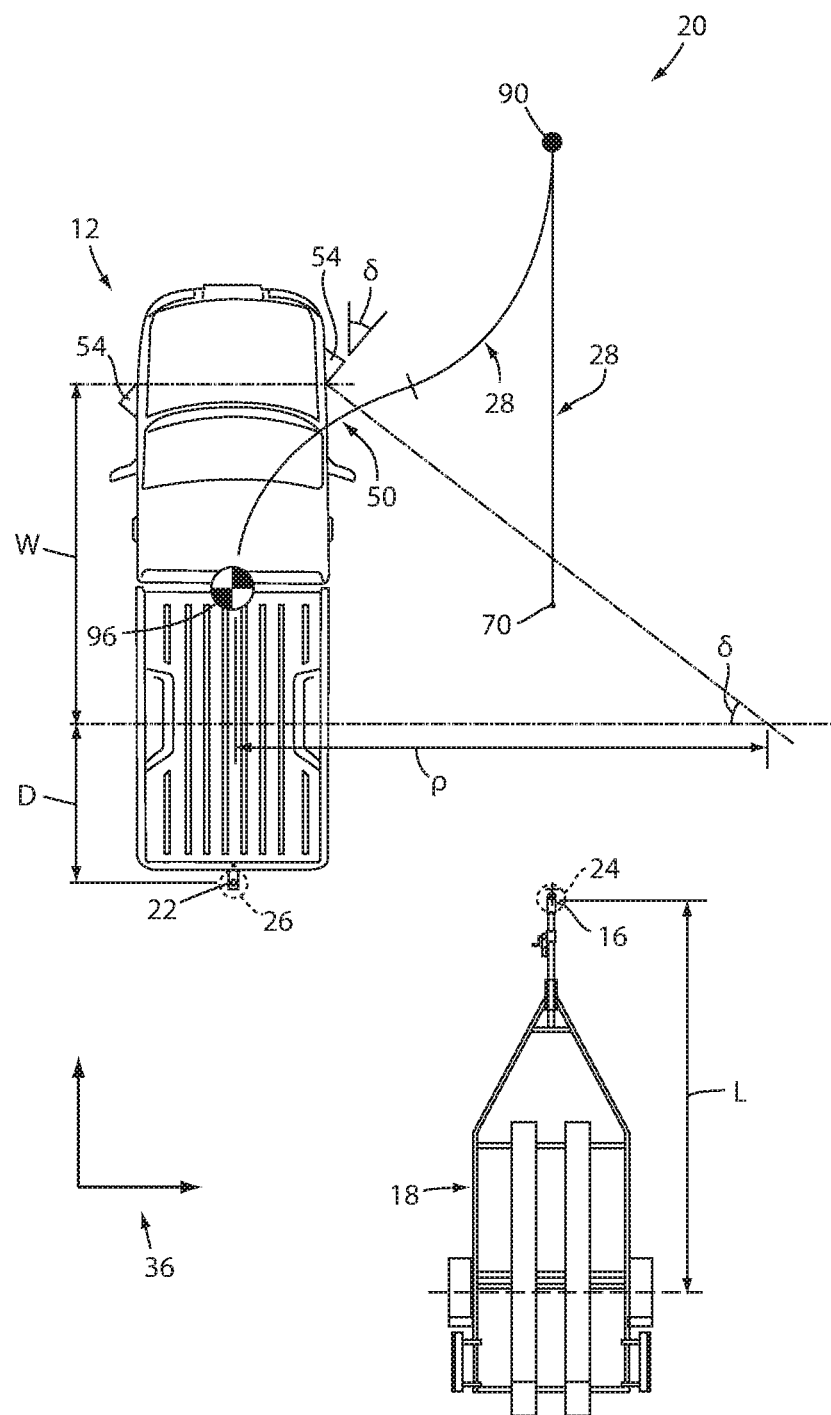
FIG. 3 is an overhead schematic view of a vehicle during a step of the alignment sequence with the trailer.
Figure 4:
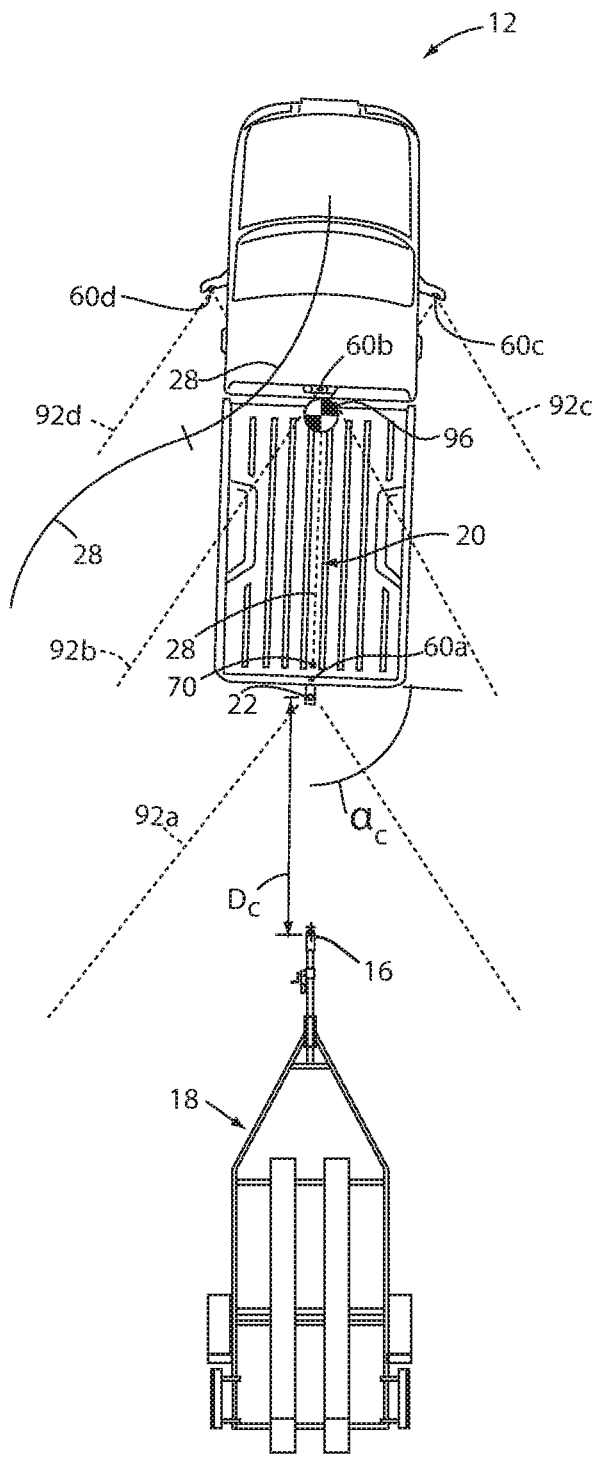
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a distance or proximity sensor or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92 (e.g. 92a, 92b, 92c, and 92d) to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the detected coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10/266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle a, of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle δ can be used to determine a corresponding turning radius ρ for vehicle 12 according to the equation:

$$\rho = \frac{1}{W\tan\delta} \quad (1)$$

in which the wheelbase W is fixed and the steering angle δ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
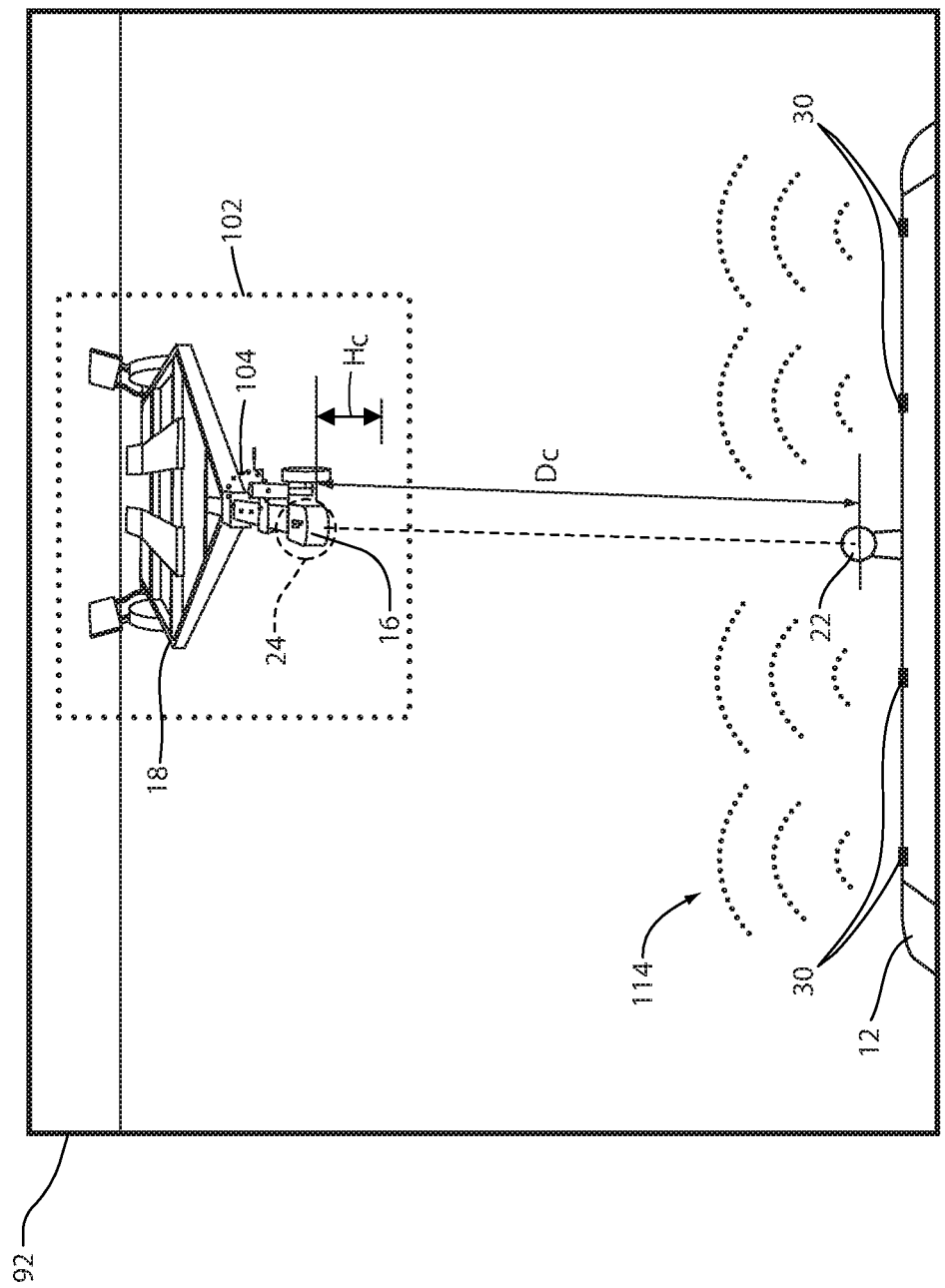
FIG. 5 is a projected view of image data demonstrating a alignment sequence of a vehicle with the trailer.
Figure 6B:
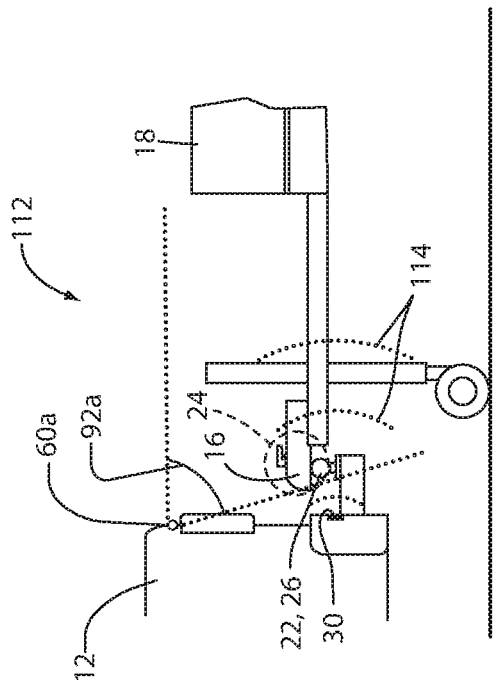
FIG. 6B is a side profile view of a vehicle approaching a trailer demonstrating a plurality of sensors detecting the trailer.
Figure 6A:
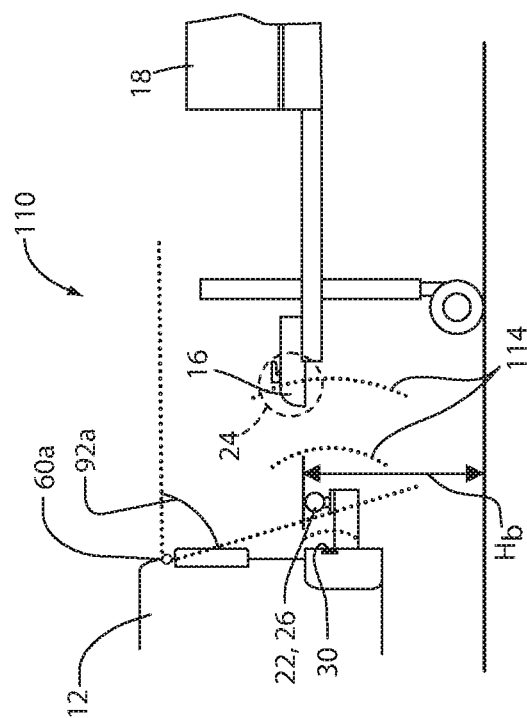
FIG. 6A is a side profile view of a vehicle approaching a trailer demonstrating a plurality of sensors detecting the trailer.

FIG. 5 demonstrates a projected view of image data demonstrating an alignment sequence with the trailer 18. Additionally, FIGS. 6A and 6B demonstrate side profile views of the vehicle 12 approaching the trailer 18 along the vehicle path 20. Referring to FIGS. 5, 6A, and 6B, in some embodiments, the system 10 may be configured to detect a proximity of the coupler 16 in connection with the trailer 18. The proximity of the trailer 18 may be detected in response to a signal received by the controller 14 from one or more proximity sensors 30. The proximity sensors 30 may correspond to various sensors including but not limited to ultrasonic sensors, electromagnetic sensors, radar sensors, laser sensors, and/or various types of sensors that may be configured to detect a distance of an object along the vehicle path 20. In this way, the controller 14 may be configured to utilize the proximity data in combination with image data or additional location information to verify and track the coupler position 24.

As demonstrated in FIG. 5, the coupler position 24 may be identified in the image data captured by the imaging system 60. Additionally, a position of the trailer 18, represented as an outline 102, may be identified in the image data. Based on the position of the trailer 18 (outline 102) in combination with the coupler position 24, the controller 14 may generally be operable to reliably identify the coupler position 24. However, in some circumstances, the controller 14 may identify a false position 104 of the coupler 16 in the image data. In such situations, the operation of the operating routine 90 aligning the hitch position 26 with coupler position 24 may result in the vehicle 12 coming in contact with the coupler 16 due to an overshoot condition.

In order to improve the operational accuracy and reduce the likelihood of errors in the detection of the coupler position 24, the system 10 may be in communication with the at least one proximity sensor 30. Based on proximity data received from the proximity sensor 30, the controller 14 may verify the coupler position 24 in relation to the hitch position 26 along the vehicle path 20. In this way, the controller 14 may compare the proximity data identifying a proximity of the trailer 18 with the image data identifying the coupler position 24 to ensure that the distance $D_c$ to the coupler 16 is accurately identified.

Referring now to FIGS. 6A and 6B, the vehicle 12 is demonstrated in an approach configuration 110 and an aligned configuration 112 in relation to the trailer 18. In addition to the challenges that may be related to the identification of the coupler 16 in the false position 104, the system 10 may also have a limited operating range over which the vehicle path 20 may be identified in the image data via the image processing routine 86. For example, in response to the distance $D_c$ to the coupler 16 being less than a tracking threshold (e.g., a predetermined minimum tracking distance), the controller 14 may be inoperable to accurately identify the coupler position 24 in the image data. Additionally, if the distance $D_c$ to the coupler 16 is less than a tracking threshold, the controller 14 may be unable to calculate the vehicle path 20 via the path derivation routine 88. Under such circumstances, operation of the system 10 in response to a request to complete the operating routine 90 may result in an error or failure.

Accordingly, in order to improve the operation of the system 10, the controller 14 may be in communication with the at least one proximity sensor 30 to identify whether the distance $D_c$ to the coupler 16 is less than the minimum tracking threshold. Based on the proximity data from the proximity sensor 30, the controller 14 may identify the proximity of the trailer 18 to approximate the distance $D_c$. Once the distance $D_c$ is approximated via the proximity data from the proximity sensor 30, the controller 14 may output instructions to the user U via the HMI 66 to move the vehicle 12 away from the trailer 18. In this way, the controller 14 may be configured to detect that the trailer 18 is too close to the vehicle 12 to successfully process path derivation and operating routines 88, 90 and instruct the user U to increase the distance $D_c$ beyond than the tracking threshold.

In FIGS. 6A and 6B, a proximity signal 114 is shown emitted from the at least one proximity sensor 30. In operation, the controller 14 may not be operable to distinguish a specific portion of the trailer 18 based solely on the proximity data from the proximity sensor 30. However, the controller 14 may accurately identify the general proximity or distance of the trailer 18 from the proximity sensor 30 to accurately indicate whether the distance $D_c$ of the coupler 16 is less than the tracking threshold. Accordingly, the controller 14 may be configured to utilize the proximity data to determine whether the system 10 is sufficiently far from the trailer 18 to accurately identify the coupler position 24 and process the operating routine 90. As further discussed in reference to FIGS. 7, 8, and 9, the controller 14 may apply the proximity data communicated from the proximity sensor 30 in combination with the image data communicated by the imaging system 60 to provide for various operating methods that may improve the accuracy and operation of the system 10.

Figure 7:
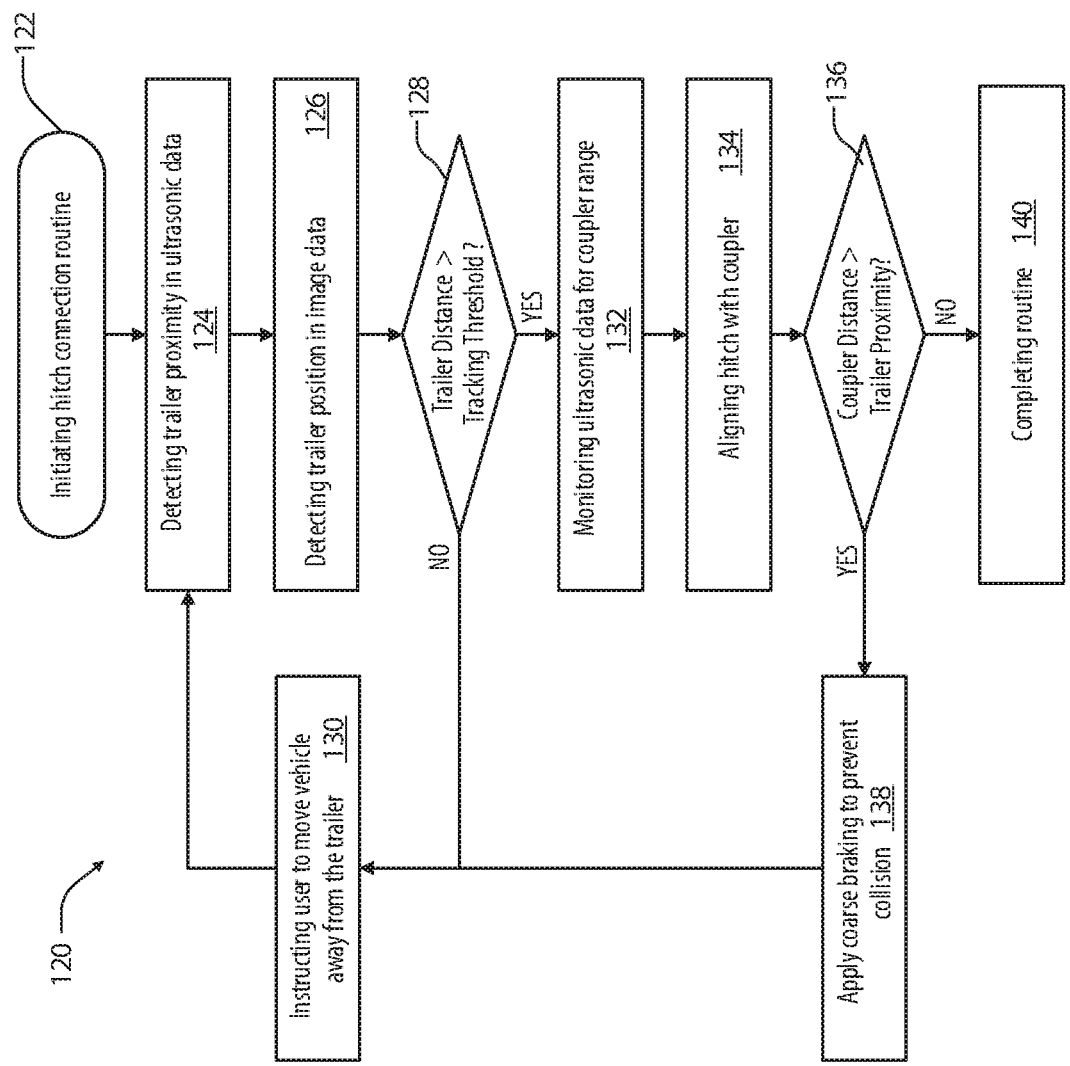
FIG. 7 is a flow chart demonstrating a method for controlling an alignment of a vehicle with a trailer utilizing proximity data and image data.

Referring to FIG. 7, a flow chart demonstrating a method 120 for controlling an alignment of the vehicle 12 with the trailer 18 is shown describing an exemplary operation utilizing the proximity data in combination with the image data. The method 120 may begin in response to the initiation of the hitch connection routine (122). For example, prior to the activation of the image processing routine 86, the controller 14 may control the at least one proximity sensor 30 to scan a region proximate the vehicle 12 to determine the proximity of the trailer 18. In response to the activation of the proximity sensor 30, the controller 14 may receive proximity data and detect the proximity of the trailer 18 (124). Additionally, the controller 14 may activate or control the imaging system 60 to capture image data and detect or attempt to detect the trailer 18 and coupler position 24 in the image data (126).

Based on the proximity data, in step 128, the controller 14 may compare the proximity or distance to the trailer 18 with the minimum distance tracking threshold. As previously discussed, the minimum distance tracking threshold may correspond to a minimum distance required for the system 10 to accurately identify the coupler position 24 in the image data. If the trailer distance identified based on the proximity data from the proximity sensor 30 is greater than the minimum tracking threshold, the controller 14 may continue to step 132 and monitor the proximity data for the coupler range or distance to the trailer 18. If the trailer distance is not greater than the minimum distance tracking threshold in step 128, the controller 14 may output an instruction via the HMI 66 instructing the user U to move the vehicle 12 away from the trailer 18 (130).

Following step 132, the controller 14 may continue the method 120 by controlling the movement of the vehicle 12 aligning the hitch position 26 with the coupler position 24 (134). During the alignment operation, the controller 14 may compare the distance $D_c$ to the coupler 16 as identified from the image data as the coupler position 24 to the trailer proximity as identified by the proximity data from the proximity sensor 30 (136). In step 136, if the distance $D_c$ to the coupler 16 as identified from the image data is greater than the trailer proximity identified based on the proximity data, the controller 14 may apply course braking via the brake control system 62 to halt the vehicle 12. In this way, the system 10 may prevent the potential collision between the vehicle 12 and trailer 18 (138). Following step 138, the method 120 may return to step 130 instructing the user to move the vehicle 12 away from the trailer 18. If the distance $D_c$ to the coupler 16 identified based on the image data is not greater than the trailer proximity in step 136, the controller 14 may continue to complete the operating routine 90 aligning the hitch position 26 with the coupler position 24 (140). In this way, the method 120 may provide for the system 10 to utilize the proximity data in combination with the image data to improve the accuracy and operation of the system 10.

Figure 8:
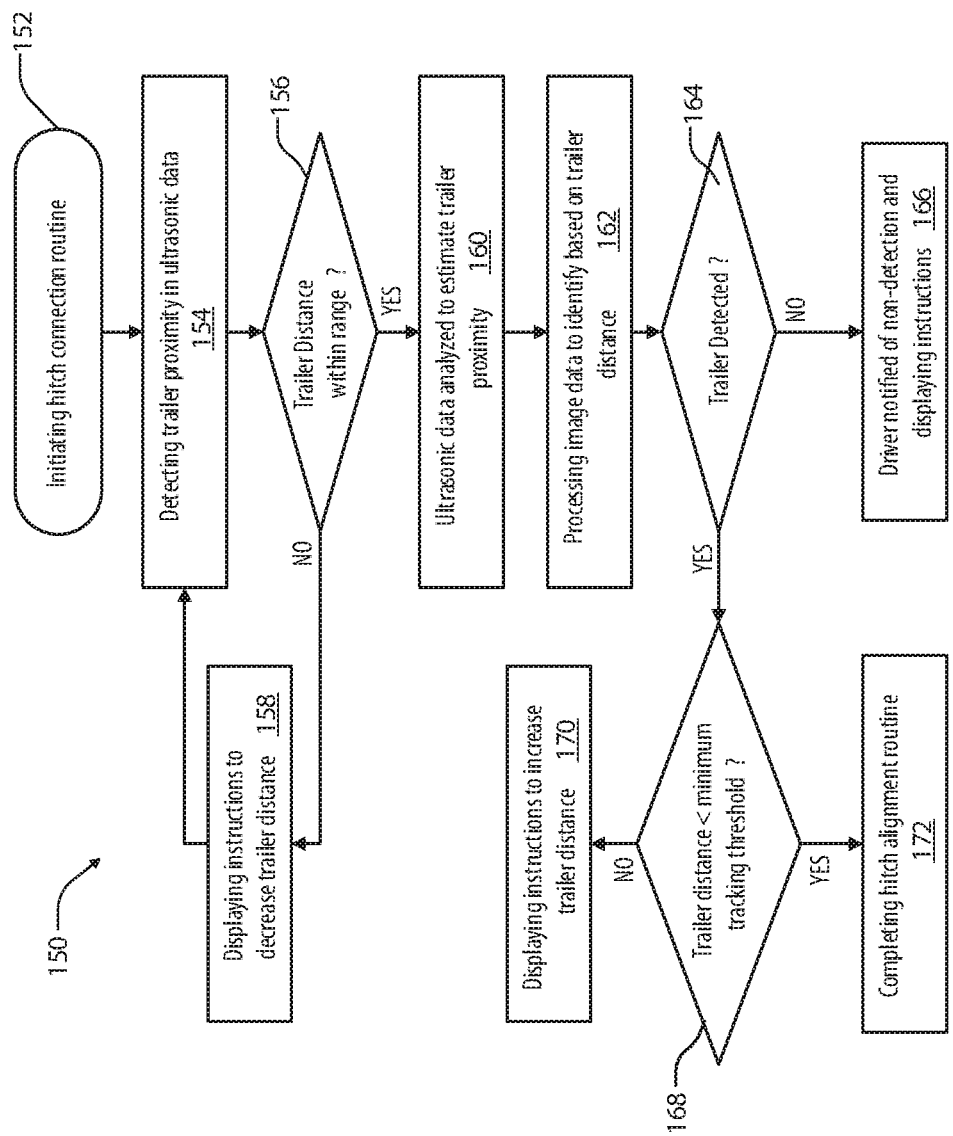
FIG. 8 is a flow chart demonstrating a method for controlling an alignment of a vehicle with a trailer identifying a minimum alignment distance for an alignment operation.

Referring now to FIG. 8, a flow chart demonstrating a method 150 for controlling alignment of the vehicle 12 with the trailer 18 is shown demonstrating a method for identifying a minimum alignment distance or minimum tracking threshold that may be required in some cases for accurate operation of the system 10. The method may begin by initiating a hitch connection routine (e.g., the operating routine 90) for the vehicle 12 (152). Upon initiation of the routine, the controller 14 may activate the proximity sensor 30 and detect the proximity of the trailer 18 via the proximity data (154). Based on the proximity data, in step 156, the controller 14 may identify if the trailer 18 is within a maximum detection range from which the system 10 can accurately identify and maneuver the hitch ball 22 of the vehicle 12 to align with the coupler 16 of the trailer 18.

In step 156, if the trailer 18 is beyond the maximum detection range, the controller 14 may display an instruction on the HMI 66 instructing the user to decrease the distance $D_c$ to the trailer 18 (158). If the trailer 18 is within the maximum detection range in step 156, the controller 14 may process the proximity data from the proximity sensor 30 to estimate the proximity of the trailer 18 (160). Additionally, the controller 14 may control the imaging system 60 to capture image data to identify the trailer 18 and the coupler position 24 (162). In step 164, the controller 14 may determine whether the trailer 18 and/or the coupler position 24 are detected. If the trailer 18 or corresponding coupler position 24 are not identified in step 164, the controller 14 may notify the user U of the non-detection of the trailer 18 and display instructions on the HMI 66 to assist the user U in aligning the vehicle 12 with the trailer 18 (166).

In step 164, the controller 14 may utilize the proximity data from the proximity sensor 30 as well as the image data from the imaging system 60 to detect the trailer 18 and/or the corresponding coupler position 24. If the trailer 18 is detected in step 164, the controller 14 may process the proximity data from the proximity sensor 30 to identify if the trailer distance is less than the minimum distance tracking threshold (168). If the trailer distance or proximity is less than the minimum tracking threshold in step 168, the controller 14 may continue to step 170 and display instructions to the user U to increase the distance between the vehicle 12 and the trailer 18 on the HMI 66 (170). In step 168, if the trailer distance or proximity is greater than the minimum tracking threshold, the controller 14 may continue to step 172 and control the vehicle 12 along the vehicle path 20 aligning the hitch position 26 with the coupler position 24. Accordingly, the method 150 may provide for the proximity sensor 30 to be used in combination with the imaging system 60 to improve the robustness operation of the system 10.

Figure 9:
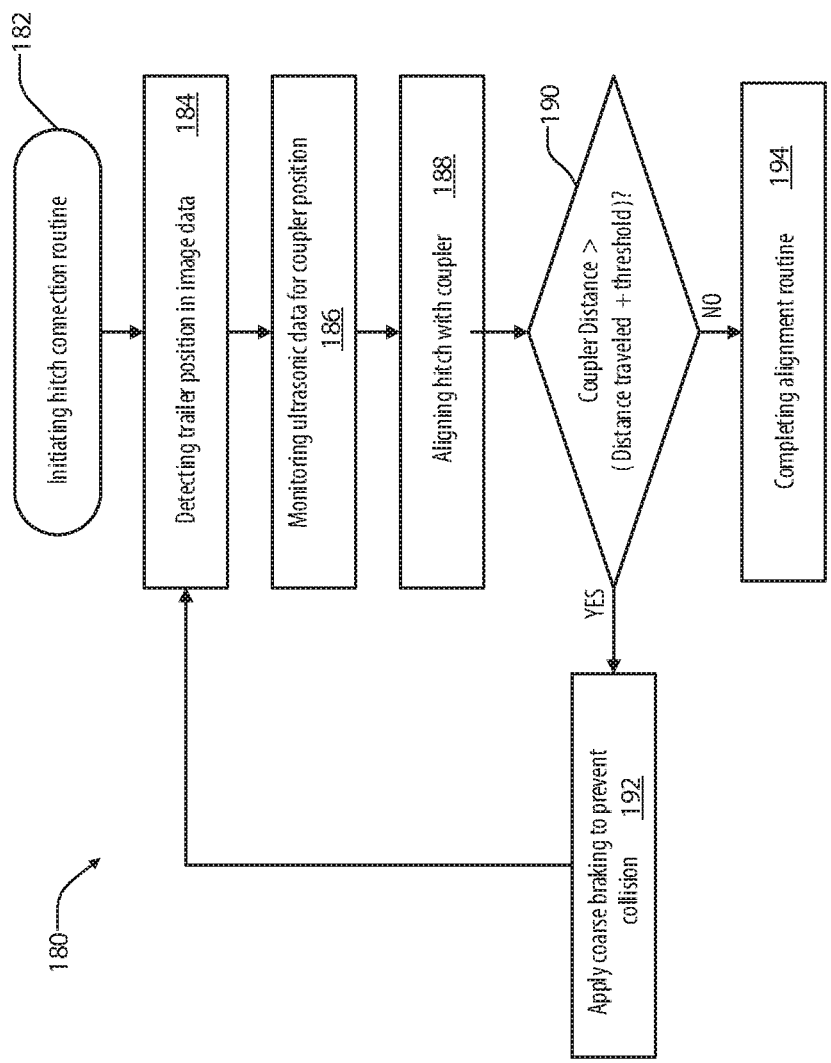
FIG. 9 is a flow chart demonstrating a method for controlling an alignment of a vehicle with a trailer utilizing proximity data in combination with additional sensor data in accordance with the disclosure.

Referring now to FIG. 9, a flow chart demonstrating a method 180 for controlling an alignment of the vehicle 12 with the trailer 18 utilizing the proximity data in combination with additional sensor data is shown. The method 180 may begin by the controller 14 initiating the hitch connection routine (182). The hitch connection routine may begin by detecting or attempting to detect the trailer 18 and/or the coupler position 24 in the image data as provided by the imaging system 60 (184). Additionally, the controller 14 may activate and monitor the proximity data from the proximity sensor 30 to identify the proximity of the trailer 18 (186). With the coupler position 24 identified in the image data, the controller 14 may apply the operating routine 90 to align the hitch position 26 with the coupler position 24 (188).

During the alignment, the controller 14 may monitor the proximity of the trailer 18 as identified from the proximity data in order to identify the approximate distance travelled by the vehicle 12. Based on the distance traveled in step 190, the controller 14 may compare the distance $D_c$ to the coupler 16 with the approximate distance traveled plus a predetermined distance threshold (190). In this way, the controller 14 may compare the approximate distance traveled plus the distance threshold with the distance $D_c$ to the coupler 16 to identify whether the coupler position 24 is misidentified or changing in the image data. If the distance $D_c$ to the coupler 16 is greater than the distance traveled plus the threshold in step 190, the controller 14 may apply course braking by the brake control system 62 to halt the vehicle 12 and prevent collision (192). In step 190, if the distance $D_c$ to the coupler 16 is not greater than the distance traveled plus the threshold, the method 180 may continue by completing the alignment of the hitch position 26 with the coupler position 24 (194).

As discussed herein, the disclosure provides for various solutions that may improve the operation of the system 10 in accuracy and robustness. Accordingly, the disclosure may provide for an improved experience of the user U in various settings. Though specific detailed steps were discussed in reference to the exemplary embodiments, such examples are merely provided as examples to demonstrate useful applications of the systems and devices disclosed by the application. It shall be understood that the system 10 and corresponding methods are provided strictly as exemplary illustrations of the disclosure that may vary or be combined in various ways without departing from the spirit of the disclosure. Additionally, the detailed embodiment shall not be considered limiting to the scope of the disclosure unless expressly required by the claims.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system, comprising:
   a hitch ball mounted on a vehicle;
   a plurality of sensor devices comprising an ultrasonic sensor and an image sensor; and
   a controller configured to:
   process image data from the image sensor identifying a coupler position of a trailer in a detection range of the image sensor, wherein the detection range comprises a minimum tracking distance within which the controller is inoperable to accurately track the coupler position via the image data;
   process ultrasonic data from the ultrasonic sensor identifying a proximity of the trailer; and
   identify the trailer within the minimum tracking distance of the image sensor based on the proximity of the trailer.

2. The system according to claim 1, wherein the controller is further configured to:
   control a motion of the vehicle aligning the hitch ball with the coupler position.

3. The system according to claim 2, wherein the controller is further configured to:
   correct for a misidentification of the coupler position identified in the image data based on the proximity of the trailer identified from the ultrasonic data.

4. The system according to claim 1, wherein the controller is further configured to:
   monitor the proximity of the trailer based on the ultrasonic data;
   monitor the location of the coupler based on the image data; and
   suppress a motion instruction calculated based on the location of the coupler detected in the image data in response to the proximity of the trailer.

5. The system according to claim 4, wherein the suppression of the motion instruction comprises stopping the motion of the vehicle.

6. The system according to claim 4, wherein the suppression of the motion instruction is in response to the proximity of the trailer being less than sum of a change in the proximity detected via the ultrasonic data and a predetermined distance constant.

7. The system according to claim 1, wherein the controller is further configured to:
   control a notification indicating that the trailer is outside the detection range.

8. The system according to claim 7, wherein the detection range of the notification provides for the vehicle to be repositioned at a greater distance within the detection range.

9. A method for controlling a vehicle comprising:
   processing image data from an image sensor identifying a coupler position of a trailer in a detection range of the image sensor, wherein the detection range comprises a minimum tracking distance within which the controller is inoperable to accurately track the coupler position via the image data;
   processing ultrasonic data identifying a proximity of the trailer;
   controlling a motion of the vehicle aligning the hitch ball with the coupler position;
   monitoring proximity of the trailer relative to the coupler position;
   identifying the trailer within the minimum tracking distance of the image sensor based on the proximity of the trailer;
   halting the motion of the vehicle in response to the proximity pf the trailer being within the minimum tracking distance.

10. The method according to claim 9, further comprising:
    capturing the image data with an image sensor; and
    capturing the ultrasonic data with an ultrasonic sensor.

11. The method according to claim 9, wherein the halting of the motion of the vehicle comprises:
correcting for a misidentification of the coupler position identified in the image data based on the proximity of the trailer identified from the ultrasonic data.

12. The method according to claim 9, further comprising;
comparing the coupler position identified based on the image data to the proximity of the trailer identified based on the ultrasonic data, wherein the comparison comprises comparing a distance to the coupler position with a change in the proximity.

13. The method according to claim 12, wherein the comparison further comprises a sum adding a predetermined distance coefficient to the change in proximity and comparing the distance to the coupler position with the sum of the change in proximity and the predetermined distance coefficient.

14. A vehicle system, comprising:
a hitch ball mounted on a vehicle;
an ultrasonic sensor configured to capture ultrasonic data rearward of the vehicle;
an image sensor configured to capture image data rearward of the vehicle; and
a controller configured to:
process image data from the image sensor identifying a coupler position of a trailer in a detection range of the image sensor, wherein the detection range comprises a minimum tracking distance within which the controller is inoperable to accurately track the coupler position via the image data;
control a motion of the vehicle aligning the hitch ball with the coupler position;
process ultrasonic data from the ultrasonic sensor identifying a proximity of the trailer;
monitor the proximity of the trailer relative to the coupler position; and
correct for a misidentification of the coupler position identified in the image data within the minimum tracking distance based on the proximity of the trailer identified from the ultrasonic data.

15. The system according to claim 14, wherein the correcting for the misidentification comprises halting the motion of the vehicle in response to a comparison of the coupler position with the proximity.

16. The system according to claim 15, wherein the comparison comprises comparing a distance to the coupler position with a change in the proximity detected via the ultrasonic data.

17. The system according to claim 16, wherein the comparison further comprises calculating a sum of a predetermined distance coefficient and the change in proximity and comparing the distance to the coupler position with the sum of the change in proximity and the predetermined distance coefficient.

* * * * *